US010110331B2

(12) United States Patent
Wells et al.

(10) Patent No.: US 10,110,331 B2
(45) Date of Patent: Oct. 23, 2018

(54) RADIO COMMUNICATION DEVICES AND METHODS FOR CONTROLLING A RADIO COMMUNICATION DEVICE

(71) Applicant: RAZER (ASIA-PACIFIC) PTE. LTD., Singapore (SG)

(72) Inventors: Stuart Wells, San Francisco, CA (US); Jeffrey Brian Kinsey, San Mateo, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/535,157

(22) PCT Filed: Dec. 12, 2014

(86) PCT No.: PCT/SG2014/000593
§ 371 (c)(1),
(2) Date: Jun. 12, 2017

(87) PCT Pub. No.: WO2016/093768
PCT Pub. Date: Jun. 16, 2016

(65) Prior Publication Data
US 2017/0324489 A1 Nov. 9, 2017

(51) Int. Cl.
*H04B 17/318* (2015.01)
*G08C 17/02* (2006.01)
(Continued)

(52) U.S. Cl.
CPC ........... *H04B 17/318* (2015.01); *G08C 17/02* (2013.01); *H04Q 9/00* (2013.01); *H04W 24/00* (2013.01);
(Continued)

(58) Field of Classification Search
CPC ............................ H04W 76/02; H04W 76/025
See application file for complete search history.

(56) References Cited

U.S. PATENT DOCUMENTS 8,621,504 B2   12/2013   Reynolds et al.
8,630,586 B2   1/2014    Dvortsov et al.
(Continued)

OTHER PUBLICATIONS

"Service discovery," Wikipedia.org, last edited Apr. 4, 2017, 2 pages, (Available online at http://en.wikipedia.org/wiki/Service_discovery, last visited Aug. 15, 2017).
(Continued)

*Primary Examiner* — Carlos E Garcia
(74) *Attorney, Agent, or Firm* — Polsinelli PC

(57) ABSTRACT

According to various embodiments, a radio communication device may be provided. The radio communication device may include: a receiver configured to receive from a first further radio communication device first information indicating a Received Signal Strength Indication in the first further radio communication device and configured to receive from a second further radio communication device second information indicating a Received Signal Strength Indication in the second further radio communication device; a selection circuit configured to select the first further radio communication device or the second further radio communication device based on the first information and the second information; and a pairing request circuit configured to send a request for pairing to the selected further radio communication device.

9 Claims, 7 Drawing Sheets

(51) Int. Cl.
*H04Q 9/00* (2006.01)
*H04W 24/00* (2009.01)

(52) U.S. Cl.
CPC ..... *G08C 2201/20* (2013.01); *H04Q 2209/43* (2013.01)

(56) References Cited

U.S. PATENT DOCUMENTS

| | | | | |
|---|---|---|---|---|
| 9,338,638 | B1* | 5/2016 | Palin | H04W 4/008 |
| 9,686,676 | B2* | 6/2017 | Palin | H04W 12/04 |
| 2002/0045424 | A1* | 4/2002 | Lee | H04W 36/30 |
| | | | | 455/41.2 |
| 2003/0228846 | A1 | 12/2003 | Berliner et al. | |
| 2008/0146151 | A1 | 6/2008 | Lyu et al. | |
| 2008/0157993 | A1 | 7/2008 | Du Breuil et al. | |
| 2009/0011713 | A1 | 1/2009 | Abusubaih et al. | |
| 2010/0036512 | A1 | 2/2010 | Rutjes et al. | |
| 2010/0052870 | A1 | 3/2010 | King | |
| 2010/0062711 | A1 | 3/2010 | Park | |
| 2010/0130131 | A1 | 5/2010 | Ha et al. | |
| 2010/0144274 | A1 | 6/2010 | Mcdowall et al. | |
| 2011/0273625 | A1 | 11/2011 | McMahon et al. | |
| 2012/0169854 | A1* | 7/2012 | Seo | H04N 13/0438 |
| | | | | 348/56 |
| 2012/0297440 | A1 | 11/2012 | Reams et al. | |
| 2013/0051806 | A1 | 2/2013 | Quilici et al. | |
| 2013/0093962 | A1 | 4/2013 | Bruhn et al. | |
| 2013/0235052 | A1 | 9/2013 | Seo et al. | |
| 2013/0340002 | A1 | 12/2013 | Reams et al. | |
| 2014/0179234 | A1 | 6/2014 | Lee et al. | |
| 2014/0255025 | A1 | 9/2014 | King | |
| 2014/0256260 | A1 | 9/2014 | Ueda et al. | |
| 2015/0195857 | A1* | 7/2015 | Pan | H04W 76/10 |
| | | | | 455/41.3 |

OTHER PUBLICATIONS

"Android Developers: Using Network Service Discovery," Android. com, 8 pages, (Available online at http://developer.android.com/training/connect-devices-wirelessly/nsd.html, last visited Aug. 15, 2017).

First Examination Report dated Jul. 24, 2017 in corresponding Australian Application No. 2014413687, 6 pages.

Extended European Search Report dated Feb. 1, 2018 for related EP Patent Application No. 14907824.8, 7 pages.

* cited by examiner

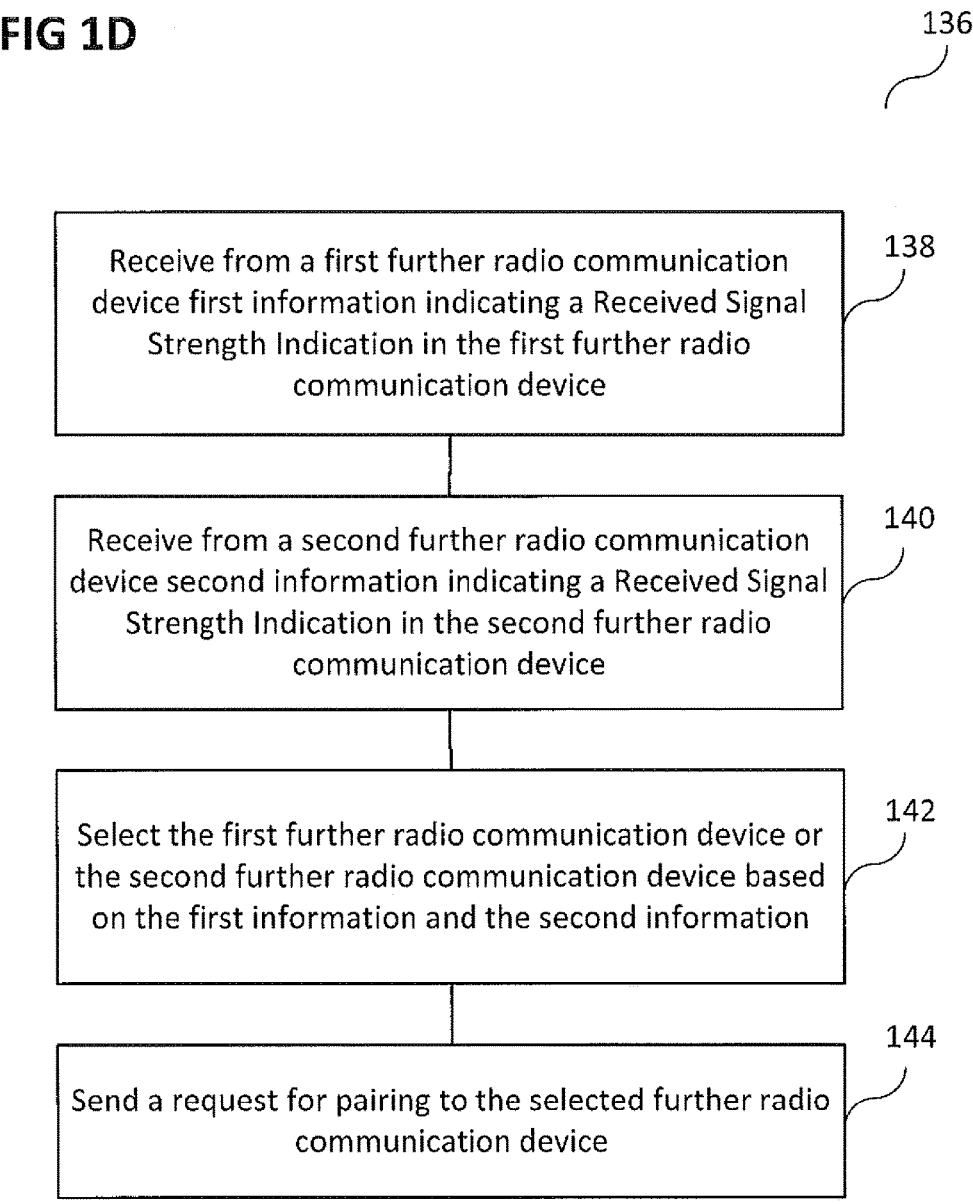

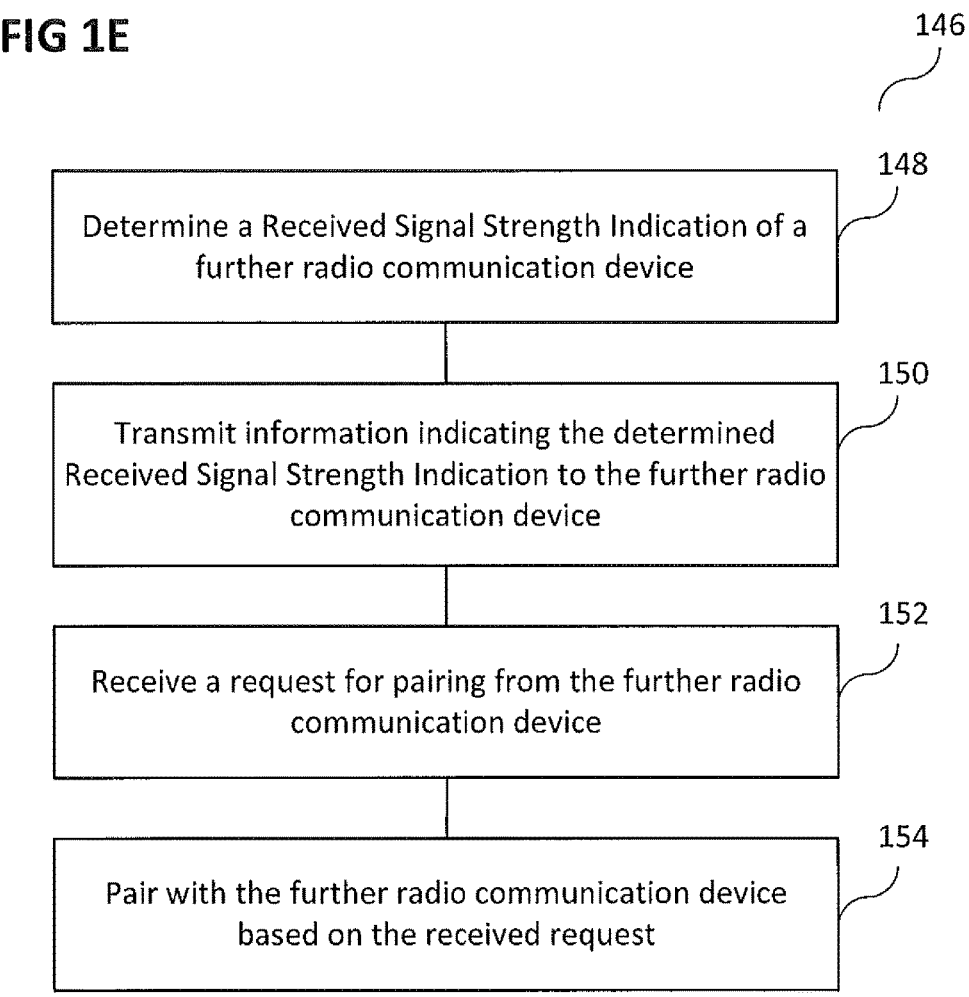

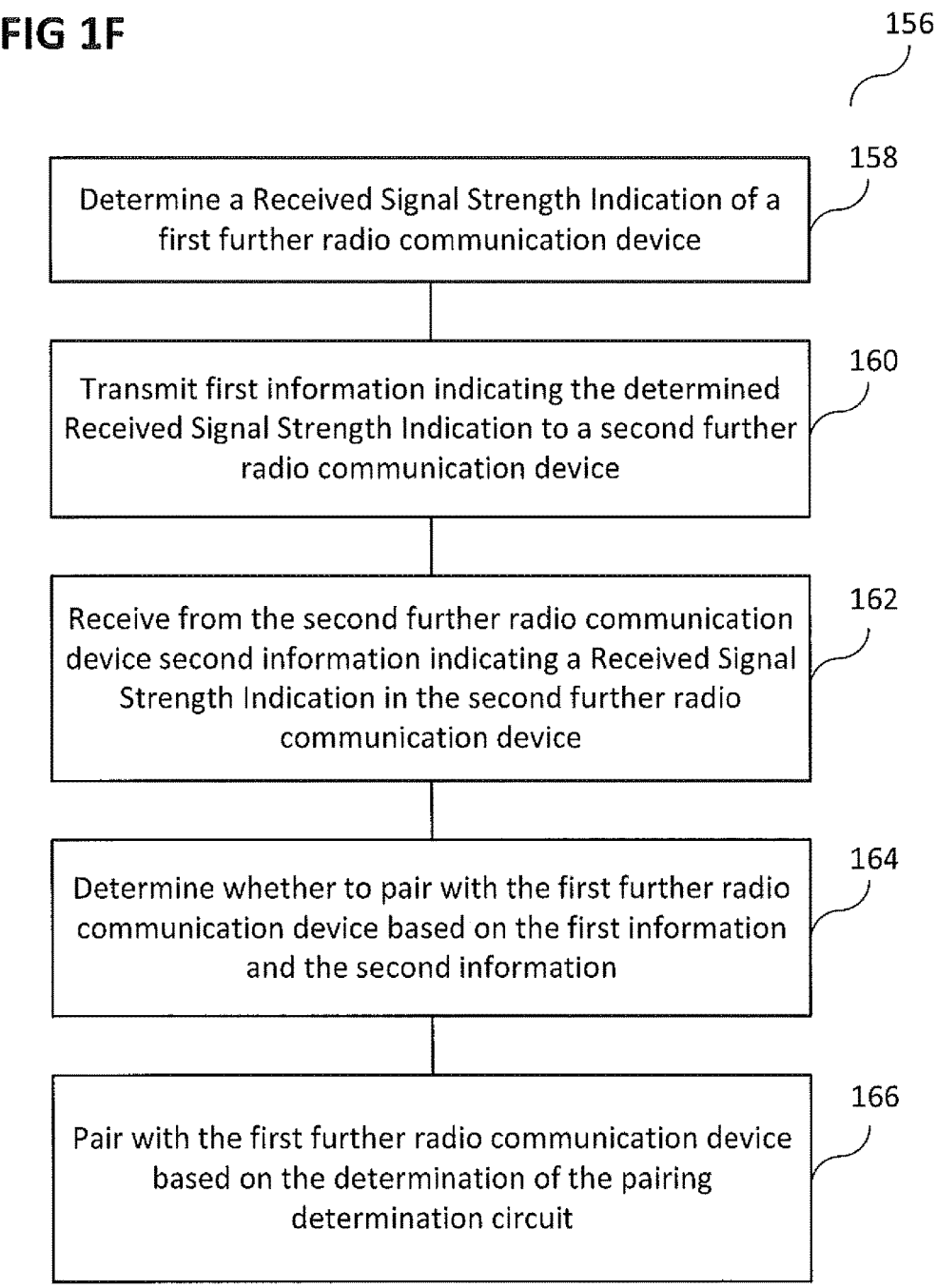

RADIO COMMUNICATION DEVICES AND METHODS FOR CONTROLLING A RADIO COMMUNICATION DEVICE

TECHNICAL FIELD

Various embodiments generally relate to radio communication devices and methods for controlling a radio communication device.

BACKGROUND

Software remote controllers (which may also be referred to as software remote control or as software remote) may be used to interface with set top boxes. There may be a situation when multiple set top boxes are available in close proximity. In a more general example, there may be situations where a plurality of physical devices that contain a Wi-Fi connection and a Bluetooth chip (for example wireless mice, wireless keyboards, wireless game controllers, physical remote controls or software remote controls) are provided and compete for connection with a host device. As such, there may be a need for a remote control selection.

SUMMARY OF THE INVENTION

According to various embodiments, a radio communication device may be provided. The radio communication device may include: a receiver configured to receive from a first further radio communication device first information indicating a Received Signal Strength Indication in the first further radio communication device and configured to receive from a second further radio communication device second information indicating a Received Signal Strength Indication in the second further radio communication device; a selection circuit configured to select the first further radio communication device or the second further radio communication device based on the first information and the second information; and a pairing request circuit configured to send a request for pairing to the selected further radio communication device.

According to various embodiments, a radio communication device may be provided. The radio communication device may include: a Received Signal Strength Indication determination circuit configured to determine a Received Signal Strength Indication of a further radio communication device; a Received Signal Strength Indication transmitter configured to transmit information indicating the determined Received Signal Strength Indication to the further radio communication device; a pairing request receiver configured to receive a request for pairing from the further radio communication device; and a pairing circuit configured to pair with the further radio communication device based on the received request.

According to various embodiments, a radio communication device may be provided. The radio communication device may include: a Received Signal Strength Indication determination circuit configured to determine a Received Signal Strength Indication of a first further radio communication device; a Received Signal Strength Indication transmitter configured to transmit first information indicating the determined Received Signal Strength Indication to a second further radio communication device; a Received Signal Strength Indication receiver configured to receive from the second further radio communication device second information indicating a Received Signal Strength Indication in the second further radio communication device; a pairing determination circuit configured to determine whether to pair with the first further radio communication device based on the first information and the second information; and a pairing circuit configured to pair with the first further radio communication device based on the determination of the pairing determination circuit.

According to various embodiments, a method for controlling a radio communication device may be provided. The method may include: receiving from a first further radio communication device first information indicating a Received Signal Strength Indication in the first further radio communication device; receiving from a second further radio communication device second information indicating a Received Signal Strength Indication in the second further radio communication device; selecting the first further radio communication device or the second further radio communication device based on the first information and the second information; and sending a request for pairing to the selected further radio communication device.

According to various embodiments, a method for controlling a radio communication device may be provided. The method may include: determining a Received Signal Strength Indication of a further radio communication device; transmitting information indicating the determined Received Signal Strength Indication to the further radio communication device; receiving a request for pairing from the further radio communication device; and pairing with the further radio communication device based on the received request.

According to various embodiments, a method for controlling a radio communication device may be provided. The method may include: determining a Received Signal Strength Indication of a first further radio communication device; transmitting first information indicating the determined Received Signal Strength Indication to a second further radio communication device; receiving from the second further radio communication device second information indicating a Received Signal Strength Indication in the second further radio communication device; determining whether to pair with the first further radio communication device based on the first information and the second information; and pairing with the first further radio communication device based on the determination of the pairing determination circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1D, FIG. 1E, and FIG. 1F show various flow diagrams illustrating methods for controlling a radio communication device according to various embodiments.

DETAILED DESCRIPTION

Figure 1A:
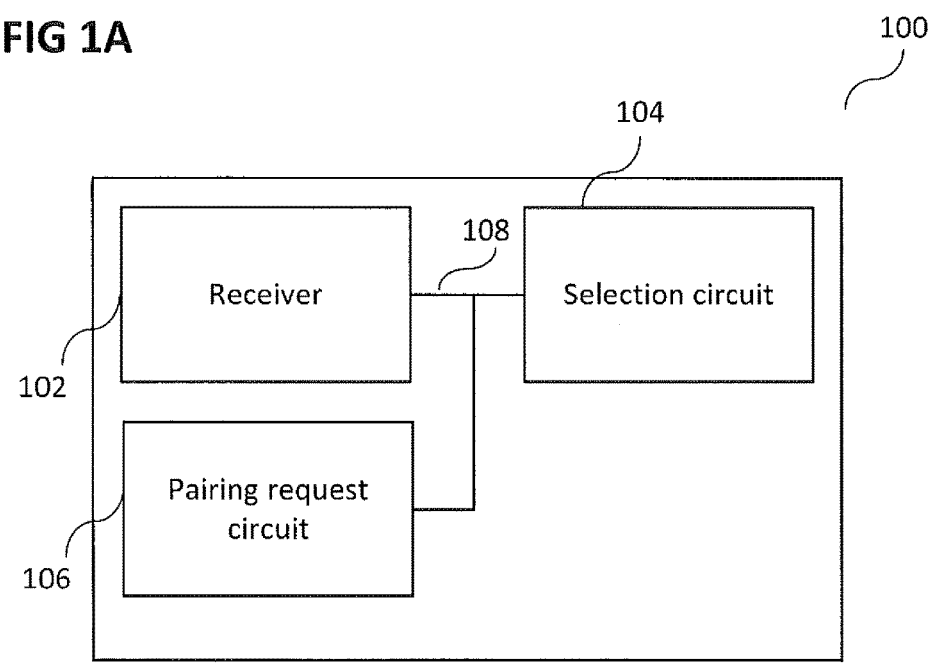
FIG. 1A, FIG. 1B, and FIG. 1C show various radio communication devices according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the various radio communication devices as described in this description may include a memory which is for example used in the processing carried out in the radio communication devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail-below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Software remote controllers (which may also be referred to as software remote control or as software remote) may be used to interface with set top boxes. There may be a situation when multiple set top boxes are available in close proximity. In a more general example, there may be situations where a plurality of physical devices that contain a Wi-Fi connection and a Bluetooth chip (for example wireless mice, wireless keyboards, wireless game controllers, physical remote controls or software remote controls) are provided and compete for connection with a host device. It will be understood that a set top box is just an example for a device with which various embodiments may be used. For example, according to various embodiments, instead of a set top box, any other device may be controlled. A set top box may be a device which includes a television (TV) tuner, and which provides output of a TV signal to a display or monitor (it will be understood that sometimes the display or monitor may be referred to as TV).

With commonly used systems, when multiple set top boxes are present, the user has no ability to automatically select the closest set top box. A solution according to various embodiments is to allow the software remote (in other words: the software remote control; in other words: the device on which the software remote control is running) to use a Wi-Fi connection and Network Service Discovery Protocol to find set top boxes available and create a list, allowing the user to select the one to use.

Since most users want to actually control the closest set top box, since they would be distributed in multiple rooms, it may be useful for the software remote to select the closest set top box and automatically select it for use. If the wrong set top box is selected, then the user may restart the application and move closer to the desired set top box.

Bluetooth 4.0 (BTLE) is a low power protocol that allows low cost devices with limited resources to advertise its presence by periodically broadcasting status information. One of BTLE proposed functionality is placing devices within a store, allowing smart phones an ability to detect their presence, and alert their user of sales or other interesting pieces of information while shopping.

Each set top box may be enabled with a BTLE chip, and may obtain information about the Received Signal Strength Indication, RSSI, for each remote control within their proximity.

Since the advertising function of Bluetooth LE (low energy) contains RSSI information, each set top box may contain information about the relative distance information since they directly scan the remote control using the Bluetooth radio. If this information is coordinated then the closet set top box may automatically be determined. This information may only be available when the set top box can directly scan the remote control, which may not be the case in Wi-Fi networks.

When multiple set top boxes are on the same network, they can share information about their RSSI for each BTLE device. When a BTLE is within range, it may connect to the closest set top box. This selection may feel automatic to a user, always selecting the set top box in the same room as the user. If the user desires a different device, it would be obvious to them to move closer to the desired set top box.

Bluetooth chips (for example according to 4.1 Bluetooth protocol, for example an Apple Bluetooth chip) may allow the device (for example iPhone or iPad) to be used in peripheral mode, thus acting as if it was a BTLE (Bluetooth LE) device. An iOS application may represent itself as a remote control, keyboard, mouse, etc.

FIG. 1A shows a radio communication device 100 according to various embodiments. The radio communication device 100 may include a receiver 102 configured to receive from a first further radio communication device (for example a radio communication device like shown in FIG. 1B) first information indicating a Received Signal Strength Indication (RSSI) in the first further radio communication device and configured to receive from a second further radio communication device (for example a radio communication device like shown in FIG. 1B) second information indicating a Received Signal Strength Indication in the second further radio communication device. The radio communication device 100 may further include a selection circuit 104 configured to select the first further radio communication device or the second further radio communication device based on the first information and the second information. The radio communication device 100 may further include a pairing request circuit 106 configured to send a request for pairing to the selected further radio communication device. The receiver 102, the selection circuit 104, and the pairing request circuit 106 may be coupled with each other, like indicated by lines 108, for example electrically coupled, for example using a line or a cable, and/or mechanically coupled.

In other words, the radio communication device 100 (for example a remote control for a set top box) may receive RSSI information indicating an RSSI of reception in the respective further radio communication device from the radio communication device from a first further radio communication device (for example a first STB) and from a second further radio communication device (for example a second STB), and may decide with which further radio communication device (for example with which STB) to pair (in other words: to connect using a short range communication) based on the RSSI information.

According to various embodiments, the radio communication device 100 may include or may be or may be included in a remote control According to various embodiments, the first further radio communication device may include or may be or may be included in an output device.

According to various embodiments, the first further radio communication device may include or may be or may be included in an input device.

According to various embodiments, the first further radio communication device may include or may be or may be included in a set top box.

According to various embodiments, the second further radio communication device may include or may be or may be included in an output device.

According to various embodiments, the second further radio communication device may include or may be or may be included in an input device.

According to various embodiments, the second further radio communication device may include or may be or may be included in a set top box.

According to various embodiments, the receiver 102 may be configured according to a Wi-Fi communication standard.

According to various embodiments, the pairing request circuit 106 may be configured according to a Wi-Fi communication standard.

According to various embodiments, the pairing request circuit 106 may be configured to request for pairing according to a Bluetooth communication standard.

According to various embodiments, the first information indicating the Received Signal Strength Indication in the first further radio communication device may include or may be or may be included in information indicating a Received Signal Strength Indication of a transmission from the radio communication device 100 to the first further radio communication device.

According to various embodiments, the second information indicating the Received Signal Strength Indication in the second further radio communication device may include or may be or may be included in information indicating a Received Signal Strength Indication of a transmission from the radio communication device 100 to the second further radio communication device.

According to various embodiments, the radio communication device 100 may, further include a further radio communication devices discovery circuit (not shown in FIG. 1A) configured to discover further radio communication devices in a communication range of the radio communication device 100.

According to various embodiments, the radio communication device 100 may further include a further radio communication devices discovery circuit (not shown in FIG. 1A) configured to discover the first further radio communication device in a communication range of the radio communication device and the second further radio communication device in a communication range of the radio communication device 100.

Figure 1B:
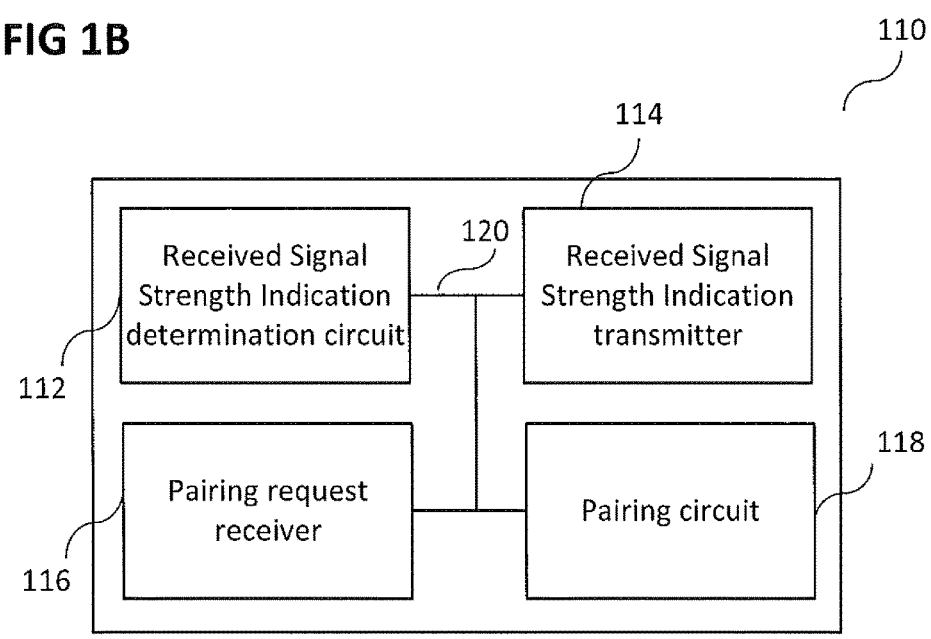

FIG. 1B shows a radio communication device 110 according to various embodiments. The radio communication device 110 may include a Received Signal Strength Indication (RSSI) determination circuit 112 configured to determine a Received Signal Strength Indication of a further radio communication device (for example a radio communication device as shown in FIG. 1A). The radio communication device 110 may further include a Received Signal Strength Indication transmitter 114 configured to transmit information indicating the determined Received Signal Strength Indication to the further radio communication device. The radio communication device 110 may further include a pairing request receiver 116 configured to receive a request for pairing from the further radio communication device. The radio communication device 110 may further include a pairing circuit 118 configured to pair with the further radio communication device based on the received request. The Received Signal Strength Indication determination circuit 112, the Received Signal Strength Indication transmitter 114, the pairing request receiver 116, and the pairing circuit 118 may be coupled with each other, like indicated by lines 120, for example electrically coupled, for example using a line or a cable, and/or mechanically coupled.

In other words, the radio communication device 110 (for example a set top box) may determine an RSSI of receiving signals from a further radio communication device (for example a remote control), and may send back information indicating the determined RSSI to the further radio communication device. Furthermore, the radio communication device 110 may pair with the further radio communication device upon request.

According to various embodiments, the radio communication device 110 may include or may be or may be included in an output device.

According to various embodiments, the radio communication device 110 may include or may be or may be included in an input device.

According to various embodiments, the radio communication device 110 may include or may be or may be included in a set top box.

According to various embodiments, the further radio communication device may include or may be or may be included in a remote control According to various embodiments, the Received Signal Strength Indication transmitter 114 may be configured according to a Wi-Fi communication standard.

According to various embodiments, the pairing request receiver 116 may be configured according to a Wi-Fi communication standard.

According to various embodiments, the pairing circuit 118 may be configured to pair with the further radio communication device according to a Bluetooth communication standard.

According to various embodiments, the Received Signal Strength Indication of the further radio communication device may include or may be or may be included in a Received Signal Strength Indication of a transmission from the further radio communication device to the radio communication device 110.

According to various embodiments, the radio communication device 110 may further include a further radio communication devices discovery circuit (not shown in FIG. 1B) configured to discover further radio communication devices in a communication range of the radio communication device 110.

According to various embodiments, the radio communication device 110 may further include a further radio communication devices discovery circuit (not shown in FIG. 1B) configured to discover the further radio communication device in a communication range of the radio communication device 110.

Figure 1C:
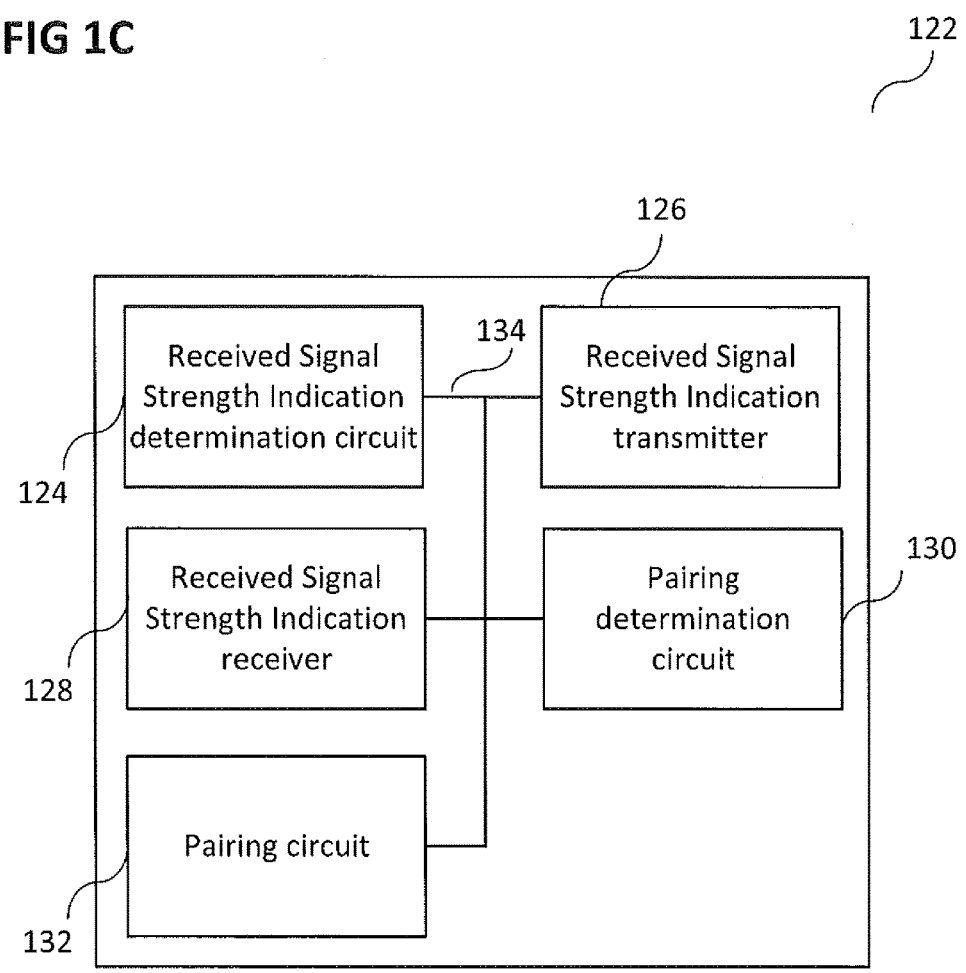

FIG. 1C shows a radio communication device 122 according to various embodiments. The radio communication device 122 may include a Received Signal Strength Indication determination circuit 124 configured to determine a Received Signal Strength Indication of a first further radio communication device. The radio communication device 122 may further include a Received Signal Strength Indication transmitter 126 configured to transmit first information indicating the determined Received Signal Strength Indication to a second further radio communication device. The radio communication device 122 may further include a Received Signal Strength Indication receiver 128 configured to receive from the second further radio communication device second information indicating a Received Signal Strength Indication in the second further radio communication device. The radio communication device 122 may further include a pairing determination circuit 130 configured to determine whether to pair with the first further radio communication device based on the first information and the second information. The radio communication device 122 may further include a pairing circuit 132 configured to pair with the first further radio communication device based on the determination of the pairing determination circuit 130. The Received Signal Strength Indication determination circuit 124, the Received Signal Strength Indication transmitter 126, the Received Signal Strength Indication receiver 128, the pairing determination circuit 130, and the pairing circuit 132 may be coupled with each other, like indicated by lines 134, for example electrically coupled, for example using a line or a cable, and/or mechanically coupled.

In other words, the radio communication device 122 (for example a STB) may determine an RSSI of signal reception from a first further radio communication device (for example a remote control), and may transmit this information to a second further radio communication device (for example another STB). Likewise, the radio communication device 122 may receive RSSI information from the second further radio communication device. Bases on the determined RSSI and the received RSSI, the radio communication device 122 may determine whether to pair with the first further radio communication device or not.

According to various embodiments, the radio communication device 122 may include or may be or may be included in an output device.

According to various embodiments, the radio communication device 122 may include or may be or may be included in an input device.

According to various embodiments, the radio communication device 122 may include or may be or may be included in a set top box.

According to various embodiments, the first further radio communication device may include or may be or may be included in a remote control.

According to various embodiments, the second further radio communication device may include or may be or may be included in an input device.

According to various embodiments, the second further radio communication device may include or may be or may be included in an output device.

According to various embodiments, the second further radio communication device may include or may be or may be included in a set top box.

According to various embodiments, the Received Signal Strength Indication transmitter 126 may be configured according to a Wi-Fi communication standard.

According to various embodiments, the Received Signal Strength Indication receiver 124 may be configured according to a Wi-Fi communication standard.

According to various embodiments, the pairing circuit 132 may be configured to pair with the first further radio communication device according to a Bluetooth communication standard.

According to various embodiments, the Received Signal Strength Indication of the further radio communication device may include or may be or may be included in a Received Signal Strength Indication of a transmission from the first further radio communication device to the radio communication device 122.

According to various embodiments, the information indicating the Received Signal Strength Indication in the second further radio communication device may include or may be or may be included in information indicating a Received Signal Strength Indication of a transmission from the first further radio communication device to the second further radio communication device.

According to various embodiments, the radio communication device 122 may further include a further radio communication devices discovery circuit (not shown in FIG. 1C) configured to discover further radio communication devices in a communication range of the radio communication device 122.

According to various embodiments, the radio communication device 122 may further include a further radio communication devices discovery circuit (not shown in FIG. 1C) configured to discover the second further radio communication device in a communication range of the radio communication device 122.

FIG. 1D shows a flow diagram 136 illustrating a method for controlling a radio communication device. In 138, first information indicating a Received Signal Strength Indication in the first further radio communication device may be received from a first further radio communication device. In 140, second information indicating a Received Signal Strength Indication in the second further radio communication device may be received from a second further radio communication device. In 142, the first further radio communication device or the second further radio communication device may be selected based on the first information and the second information. In 144, a request for pairing may be sent to the selected further radio communication device.

According to various embodiments, the radio communication device may include or may be or may be included in a remote control According to various embodiments, the first further radio communication device may include or may be or may be included in an output device.

According to various embodiments, the first further radio communication device may include or may be or may be included in an input device.

According to various embodiments, the first further radio communication device may include or may be or may be included in a set top box.

According to various embodiments, the second further radio communication device may include or may be or may be included in an output device.

According to various embodiments, the second further radio communication device may include or may be or may be included in an input device.

According to various embodiments, the second further radio communication device may include or may be or may be included in a set top box.

According to various embodiments, the receiving may include or may be or may be included in receiving according to a Wi-Fi communication standard.

According to various embodiments, the sending may include or may be or may be included in sending according to a Wi-Fi communication standard.

According to various embodiments, the request for paring may include or may be or may be included in a request for pairing according to a Bluetooth communication standard.

According to various embodiments, the first information indicating the Received Signal Strength Indication in the first further radio communication device may include or may be or may be included in information indicating a Received Signal Strength Indication of a transmission from the radio communication device to the first further radio communication device.

According to various embodiments, the second information indicating the Received Signal Strength Indication in the second further radio communication device may include or may be or may be included in information indicating a Received Signal Strength Indication of a transmission from the radio communication device to the second further radio communication device.

According to various embodiments, the method may further include discovering further radio communication devices in a communication range of the radio communication device.

According to various embodiments, the method may further include discovering the first further radio communication device in a communication range of the radio communication device and the second further radio communication device in a communication range of the radio communication device.

FIG. 1E shows a flow diagram 146 illustrating a method for controlling a radio communication device. In 148, a Received Signal Strength Indication of a further radio communication device may be determined. In 150, information indicating the determined Received Signal Strength Indication may be transmitted to the further radio communication device. In 152, a request for pairing may be received from the further radio communication device. In 154, pairing with the further radio communication device may be performed based on the received request.

According to various embodiments, the radio communication device may include or may be or may be included in an output device.

According to various embodiments, the radio communication device may include or may be or may be included in an input device.

According to various embodiments, the radio communication device may include or may be or may be included in a set top box.

According to various embodiments, the further radio communication device may include or may be or may be included in a remote control According to various embodiments, the transmitting may include or may be or may be included in transmitting configured according to a Wi-Fi communication standard.

According to various embodiments, the receiving may include or may be or may be included in receiving according to a Wi-Fi communication standard.

According to various embodiments, the pairing may include or may be or may be included in pairing with the further radio communication device according to a Bluetooth communication standard.

According to various embodiments, the Received Signal Strength Indication of the further radio communication device may include or may be or may be included in a Received Signal Strength Indication of a transmission from the further radio communication device to the radio communication device.

According to various embodiments, the method may further include discovering further radio communication devices in a communication range of the radio communication device.

According to various embodiments, the method may further include discovering the further radio communication device in a communication range of the radio communication device.

FIG. 1F shows a flow diagram 156 illustrating a method for controlling a radio communication device. In 158, a Received Signal Strength Indication of a first further radio communication device may be determined. In 160, first information indicating the determined Received Signal Strength Indication may be transmitted to a second further radio communication device. In 162, second information indicating a Received Signal Strength Indication in the second further radio communication device may be received from the second further radio communication device. In 164, it may be determined whether to pair with the first further radio communication device based on the first information and the second information. In 166, pairing with the first further radio communication device may be performed based on the determination of the pairing determination circuit.

According to various embodiments, the radio communication device may include or may be or may be included in an output device.

According to various embodiments, the radio communication device may include or may be or may be included in an input device.

According to various embodiments, the radio communication device may include or may be or may be included in a set top box.

According to various embodiments, the first further radio communication device may include or may be or may be included in a remote control.

According to various embodiments, the second further radio communication device may include or may be or may be included in an input device.

According to various embodiments, the second further radio communication device may include or may be or may be included in an output device.

According to various embodiments, the second further radio communication device may include or may be or may be included in a set top box.

According to various embodiments, the transmitting may include or may be or may be included in transmitting according to a Wi-Fi communication standard.

According to various embodiments, wherein the receiving may include or may be or may be included in receiving according to a Wi-Fi communication standard.

According to various embodiments, the pairing may include or may be or may be included in pairing with the first further radio communication device according to a Bluetooth communication standard.

According to various embodiments, the Received Signal Strength Indication of the further radio communication device may include or may be or may be included in a Received Signal Strength Indication of a transmission from the first further radio communication device to the radio communication device.

According to various embodiments, the information indicating the Received Signal Strength Indication in the second further radio communication device may include or may be or may be included in information indicating a Received Signal Strength Indication of a transmission from the first further radio communication device to the second further radio communication device.

According to various embodiments, the method may further include discovering further radio communication devices in a communication range of the radio communication device.

According to various embodiments, the radio communication device may further include discovering the second further radio communication device in a communication range of the radio communication device.

According to various embodiments, a computer readable medium having recorded instructions thereon which, when executed by a processor, make the processor perform a method for controlling a radio communication device may be provided. The method for controlling a radio communication device may be any one of the methods as described above.

According to various embodiments, an automatic remote control selection may be provided when multiple game consoles are available.

Figure 2:
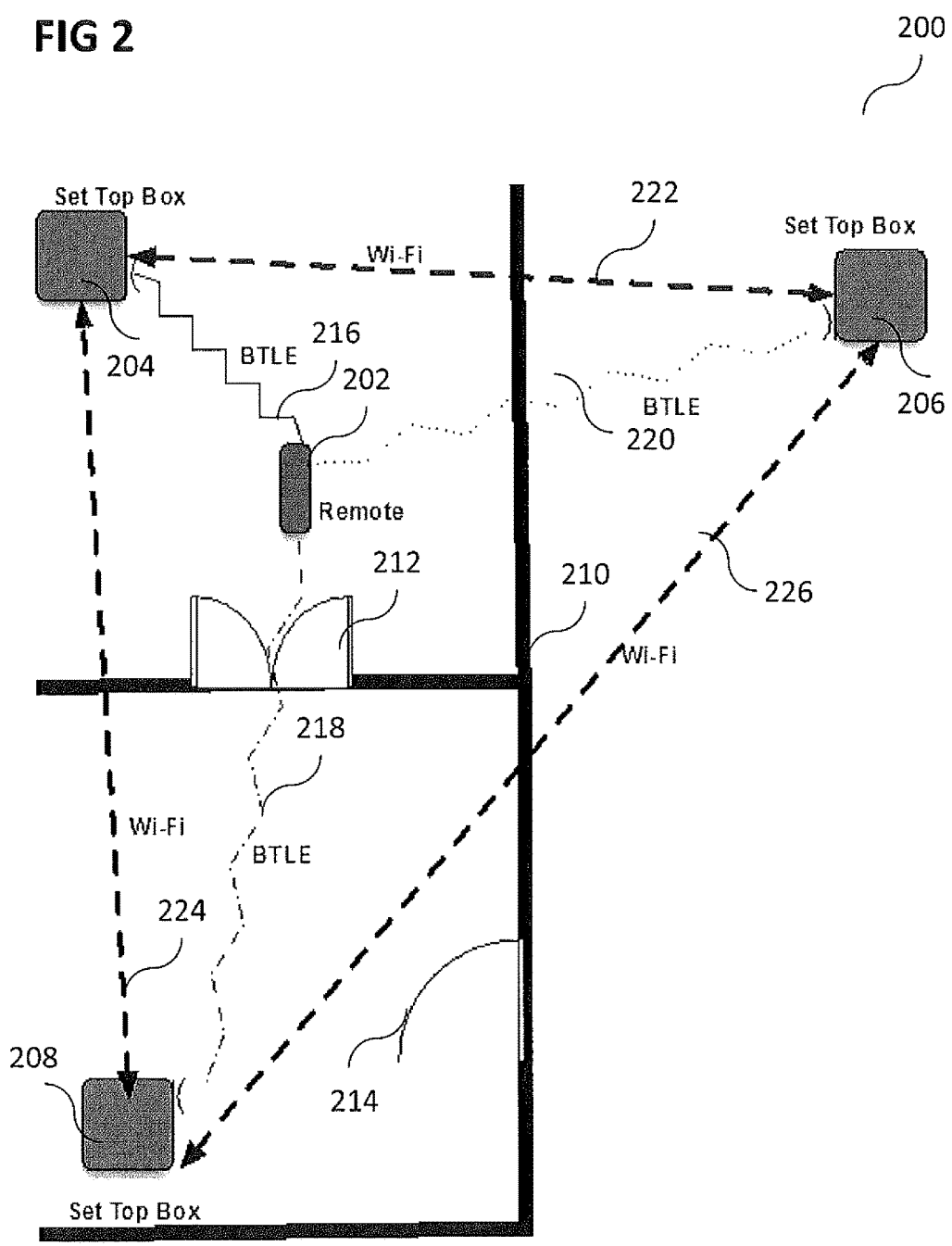
FIG. 2 and FIG. 3 illustrate two embodiments for finding the closest set top box.
Figure 3:
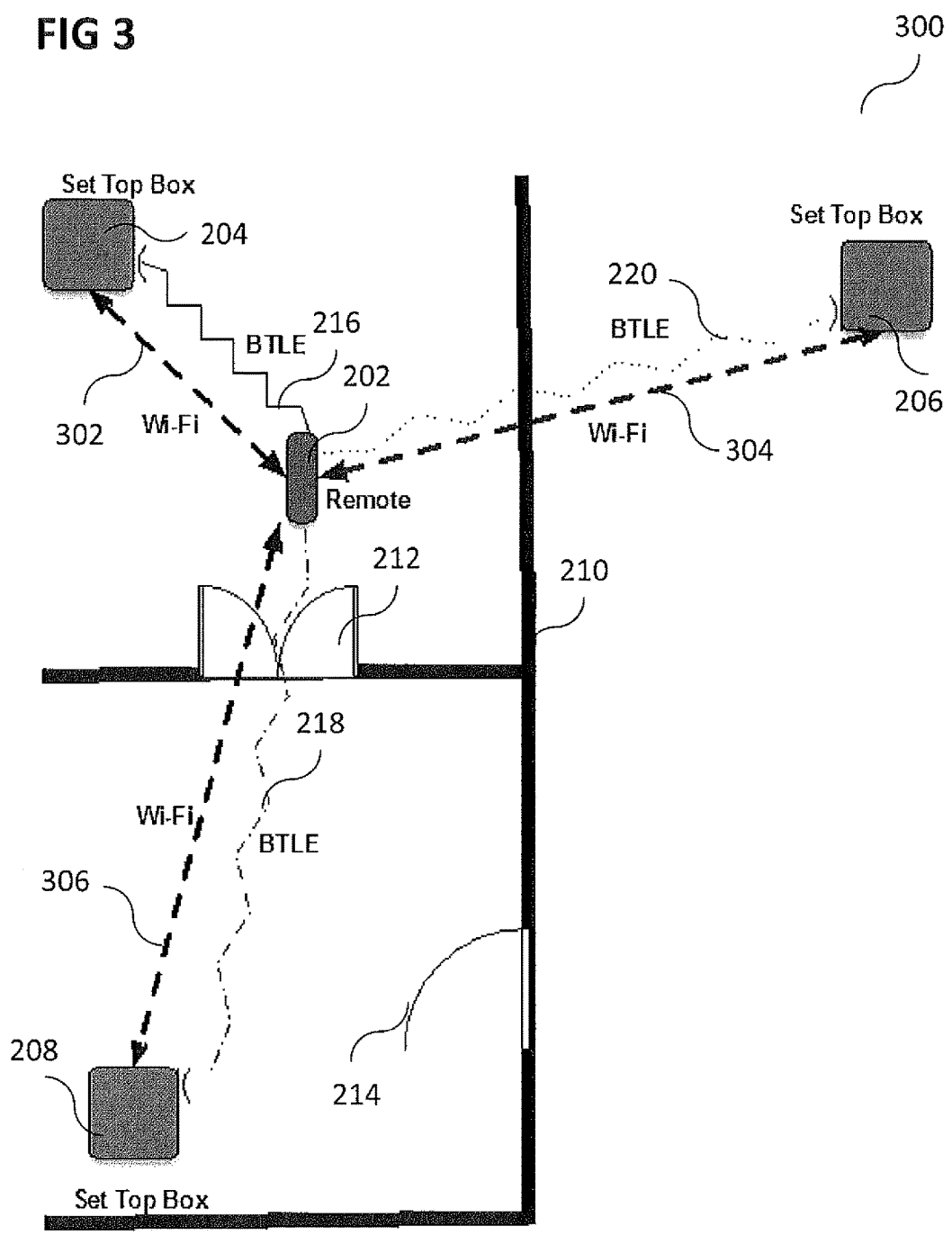

FIG. 2 and FIG. 3 illustrate two embodiments for finding the closest set top box.

FIG. 2 shows an illustration 200 of an exemplary configuration in which various embodiments may be used. For example, a remote control 202 and a first set top box 204, a second set top box 206, and a third set top box 208 may be provided in an environment, for example an apartment including walls 210, and doors 212 and 214. It will be understood that the configuration as shown in FIG. 2 is merely an example, and that any number of STBs may be provided, and that any layout of the environment (with or without walls, and with or without doors or windows) may be provided. It will be understood that in the example shown in FIG. 2, a device may be identified by a generated universally unique identifier (UUID) or using its hardware address.

According to various embodiments, each set top box may discover others (for example other set top boxes) connected to a network using a Service Discovery Protocol. Once each Set Top Box discovers each other (in other words: discovers other set top boxes) on a network, they connect together in a star pattern, where each box communicates with all other STB on the network. For example, in the layout as shown in FIG. 2, the first STB 202 may be connected (for example via Wi-Fi) to the second STB 206, like indicated by arrow 222, and to the third STB 208, like indicated by arrow 224. Furthermore, the second STB 206 may be connected (for example via Wi-Fi) to the third STB 208, like indicated by arrow 226.

The set top boxes may begin to share the BTLE hardware addresses and Radio Signal Strength Information, RSSI, for each BTLE software remote control application (in other words: software remote control; in other words: remote control) they detect. For example, for each software remote control application, each STB may determine the BTLE hardware addresses and Radio Signal Strength Information, RSSI, and then may share this information with the other STBs.

Once the set top boxes agree which one has the strongest RSSI to the software remote control, it may initiate a BTLE paring (for example with the software remote control application). The software remote control application may continue to be paired to that Set Top Box until the user closes the application.

In the example shown in FIG. 2, the remote control 202 may be closest to the first set top box 204. The first STB 204 may determine the reception quality (for example RSSI) from the remote control 202, and may share this information with the second STB 206 and the third STB 208. The second STB 204 may determine the reception quality (for example RSSI) from the remote control 202, and may share this information with the first STB 204 and the third STB 208. The third STB 204 may determine the reception quality (for example RSSI) from the remote control 202, and may share this information with the first STB 204 and the second STB 206.

Each of the first STB 204, the second STB 206, and the third STB 208 may determine the STB with the strongest connection (in other words: best connection; in other words: best reception quality of communication from the remote control 202; for example highest RSSI) to the remote control 202 (which may for example be considered the STB closest to the remote control 202). In the example of FIG. 2, the first set top box 204 may have the strongest connection, and as such, the first set top box 204 may start pairing with the remote control 202, like indicated by a solid line connection 216 between the remote control 202 and the first STB 204. The second STB 206 and the third STB 208 may not be paired with the remote control 202, like indicated by dashed lines 218 and 220.

The remote control 202 may have a Bluetooth LE implementation. For the system shown in FIG. 2, where the set top boxes communicate RSSI information to determine which is closest, any kind of remote control, or gamepad, or keyboard, or mouse which is closest to a STB may be determined (in other words: any kind of remote control, or gamepad, or keyboard, or mouse may be paired with a closest STB).

FIG. 3 shows an illustration 300 of an exemplary configuration in which various embodiments may be used. Various portions of FIG. 3 may be similar or identical to what is shown in FIG. 2, and as such, the same reference signs may be used and duplicate description may be omitted.

According to various embodiments, the software remote control application may use a Wi-Fi network discovery protocol to find all available set top boxes, for example like indicated by a first arrow 302 with the first STB 204, a second arrow 304 with the second STB 206, and a third arrow 306 with the third STB 208. The remote application 202 may communicate to each STB using a Wi-Fi socket connection and identify itself using the BTLE hardware address it represents. Each STB may respond back with the BTLE RSSI they are detecting for that remote control. The software remote control application 202 may then determine which STB is closest by selecting the one with the greatest RSSI value (for example the first STB 204 in the example of FIG. 3). The remote application 202 may then request that STB 204 to initiate a BTLE paring with it. Once the STB 204 pairs with the software remote control 202, all further communication between them may take place using Bluetooth.

An alternative method for the system to identify itself may be for the software remote control device to provide a universally unique identifier, UUID, in the information that the BTLE advertises to the set top box. The set top box may search for the device with the UUID. The software remote controller may also present a characteristic that contains a unique identifier, allowing the set top box to examine it, to distinguish it from other software remotes. In other words, a hardware address may be used as a unique identification, but a generated unique identifier could also be presented when adverting the software remote, then request the set top box respond to that unique identify and report its RSSI information. It will be understood that any unique identification could be used for identifying the device.

In the embodiment shown in FIG. 3, rather than having set top boxes talking with one another (like shown in FIG. 2), the software remote may talk to all of them using Wi-Fi. The software remote may request its own RSSI information for Bluetooth by specifying its Bluetooth hardware address or a generated UUID. Each set top box may respond with its report RSSI information, and then the software remote may select the closest set top box. Once it determines the closest set top box, it may contact it with Wi-Fi, and request that it initiates a Bluetooth pairing request.

With Bluetooth, according to various embodiments, it may always be the set top box that initiates the pairing with the remote. The remote may talk with each set top box using Wi-Fi. So a communication protocol can be established consisting:

1) From Software Remote to STB, what is my Bluetooth RSSI that you see?
2) STB tells software remote the RSSI it has.
3) Software remote, talks with all other STB it sees.
4) Software remote picks the STB that is the closest.
5) Software remote tells the closest STB, pair with me.

Then, the user may use the device. When the application closes, the software remote may ask the STB to unpair with the software remote.

A software remote control may be available for the user to download and connect with the Set Top Box (STB). In an environment where multiple STB are present, the iOS application may provide a list for the user to select the one to connect. According to various embodiments, the pull down list of STB may be eliminated, and the iOS software remote may automatically connect with the probable closest STB device.

An automatic closest Set Top Box connection according to various embodiments may improve a remote control, for example a software remote control.

Various embodiments may not be limited to Set Top Boxes or Game Consoles, but may be applied to mice, keyboards, etc.

The following examples pertain to further embodiments.

Example 1 is a radio communication device comprising: a receiver configured to receive from a first further radio communication device first information indicating a Received Signal Strength Indication in the first further radio communication device and configured to receive from a second further radio communication device second information indicating a Received Signal Strength Indication in the second further radio communication device; a selection circuit configured to select the first further radio communication device or the second further radio communication device based on the first information and the second information; and a pairing request circuit configured to send a request for pairing to the selected further radio communication device.

In example 2, the subject-matter of example 1 can optionally include that the radio communication device comprises a remote control In example 3, the subject-matter of any one of examples 1 to 2 can optionally include that the first further radio communication device comprises an output device.

In example 4, the subject-matter of any one of examples 1 to 3 can optionally include that the first further radio communication device comprises an input device.

In example 5, the subject-matter of any one of examples 1 to 4 can optionally include that the first further radio communication device comprises a set top box.

In example 6, the subject-matter of any one of examples 1 to 5 can optionally include that the second further radio communication device comprises an output device.

In example 7, the subject-matter of any one of examples 1 to 6 can optionally include that the second further radio communication device comprises an input device.

In example 8, the subject-matter of any one of examples 1 to 7 can optionally include that the second further radio communication device comprises a set top box.

In example 9, the subject-matter of any one of examples 1 to 8 can optionally include that the receiver is configured according to a Wi-Fi communication standard.

In example 10, the subject-matter of any one of examples 1 to 9 can optionally include that the pairing request circuit is configured according to a Wi-Fi communication standard.

In example 11, the subject-matter of any one of examples 1 to 10 can optionally include that the pairing request circuit is configured to request for pairing according to a Bluetooth communication standard.

In example 12, the subject-matter of any one of examples 1 to 11 can optionally include that the first information indicating the Received Signal Strength Indication in the first further radio communication device comprises information indicating a Received Signal Strength Indication of a transmission from the radio communication device to the first further radio communication device.

In example 13, the subject-matter of any one of examples 1 to 12 can optionally include that the second information indicating the Received Signal Strength Indication in the second further radio communication device comprises information indicating a Received Signal Strength Indication of a transmission from the radio communication device to the second further radio communication device.

In example 14, the subject-matter of any one of examples 1 to 13 can optionally include a further radio communication devices discovery circuit configured to discover further radio communication devices in a communication range of the radio communication device.

In example 15, the subject-matter of any one of examples 1 to 14 can optionally include a further radio communication devices discovery circuit configured to discover the first further radio communication device in a communication range of the radio communication device and the second further radio communication device in a communication range of the radio communication device.

Example 16 is a radio communication device comprising: a Received Signal Strength Indication determination circuit configured to determine a Received Signal Strength Indication of a further radio communication device; a Received Signal Strength Indication transmitter configured to transmit information indicating the determined Received Signal Strength Indication to the further radio communication device; a pairing request receiver configured to receive a request for pairing from the further radio communication device; and a pairing circuit configured to pair with the further radio communication device based on the received request.

In example 17, the subject-matter of example 16 can optionally include that the radio communication device comprises an output device.

In example 18, the subject-matter of any one of examples 16 to 17 can optionally include that the radio communication device comprises an input device.

In example 19, the subject-matter of any one of examples 16 to 18 can optionally include that the radio communication device comprises a set top box.

In example 20, the subject-matter of any one of examples 16 to 19 can optionally include that the further radio communication device comprises a remote control In example 21, the subject-matter of any one of examples 16 to 20 can optionally include that the Received Signal Strength Indication transmitter is configured according to a Wi-Fi communication standard.

In example 22, the subject-matter of any one of examples 16 to 21 can optionally include that the pairing request receiver is configured according to a Wi-Fi communication standard.

In example 23, the subject-matter of any one of examples 16 to 22 can optionally include that the pairing circuit is configured to pair with the further radio communication device according to a Bluetooth communication standard.

In example 24, the subject-matter of any one of examples 16 to 23 can optionally include that the Received Signal Strength Indication of the further radio communication device comprises a Received Signal Strength Indication of a transmission from the further radio communication device to the radio communication device.

In example 25, the subject-matter of any one of examples 16 to 24 can optionally include a further radio communication devices discovery circuit configured to discover further radio communication devices in a communication range of the radio communication device.

In example 26, the subject-matter of any one of examples 16 to 25 can optionally include a further radio communication devices discovery circuit configured to discover the further radio communication device in a communication range of the radio communication device.

Example 27 is a radio communication device comprising: a Received Signal Strength Indication determination circuit configured to determine a Received Signal Strength Indication of a first further radio communication device; a Received Signal Strength Indication transmitter configured to transmit first information indicating the determined Received Signal Strength Indication to a second further radio communication device; a Received Signal Strength Indication receiver configured to receive from the second further radio communication device second information indicating a Received Signal Strength Indication in the second further radio communication device; a pairing determination circuit configured to determine whether to pair with the first further radio communication device based on the first information and the second information; and a pairing circuit configured to pair with the first further radio communication device based on the determination of the pairing determination circuit.

In example 28, the subject-matter of example 27 can optionally include that the radio communication device comprises an output device.

In example 29, the subject-matter of any one of examples 27 to 28 can optionally include that the radio communication device comprises an input device.

In example 30, the subject-matter of any one of examples 27 to 29 can optionally include that the radio communication device comprises a set top box.

In example 31, the subject-matter of any one of examples 27 to 30 can optionally include that the first further radio communication device comprises a remote control.

In example 32, the subject-matter of any one of examples 27 to 31 can optionally include that the second further radio communication device comprises an input device.

In example 33, the subject-matter of any one of examples 27 to 32 can optionally include that the second further radio communication device comprises an output device.

In example 34, the subject-matter of any one of examples 27 to 33 can optionally include that the second further radio communication device comprises a set top box.

In example 35, the subject-matter of any one of examples 27 to 34 can optionally include that the Received Signal Strength Indication transmitter is configured according to a Wi-Fi communication standard.

In example 36, the subject-matter of any one of examples 27 to 35 can optionally include that the Received Signal Strength Indication receiver is configured according to a Wi-Fi communication standard.

In example 37, the subject-matter of any one of examples 27 to 36 can optionally include that the pairing circuit is configured to pair with the first further radio communication device according to a Bluetooth communication standard.

In example 38, the subject-matter of any one of examples 27 to 37 can optionally include that the Received Signal Strength Indication of the further radio communication device comprises a Received Signal Strength Indication of a transmission from the first further radio communication device to the radio communication device.

In example 39, the subject-matter of any one of examples 27 to 38 can optionally include that the information indicating the Received Signal Strength Indication in the second further radio communication device comprises information indicating a Received Signal Strength Indication of a transmission from the first further radio communication device to the second further radio communication device.

In example 40, the subject-matter of any one of examples 27 to 39 can optionally include a further radio communication devices discovery circuit configured to discover further radio communication devices in a communication range of the radio communication device.

In example 41, the subject-matter of any one of examples 27 to 40 can optionally include a further radio communication devices discovery circuit configured to discover the second further radio communication device in a communication range of the radio communication device.

Example 42 is a method for controlling a radio communication device, the method comprising: receiving from a first further radio communication device first information indicating a Received Signal Strength Indication in the first further radio communication device; receiving from a second further radio communication device second information indicating a Received Signal Strength Indication in the second further radio communication device; selecting the first further radio communication device or the second further radio communication device based on the first information and the second information; and sending a request for pairing to the selected further radio communication device.

In example 43, the subject-matter of example 42 can optionally include that the radio communication device comprises a remote control In example 44, the subject-matter of any one of examples 42 to 43 can optionally include that the first further radio communication device comprises an output device.

In example 45, the subject-matter of any one of examples 42 to 44 can optionally include that the first further radio communication device comprises an input device.

In example 46, the subject-matter of any one of examples 42 to 45 can optionally include that the first further radio communication device comprises a set top box.

In example 47, the subject-matter of any one of examples 42 to 46 can optionally include that the second further radio communication device comprises an output device.

In example 48, the subject-matter of any one of examples 42 to 47 can optionally include that the second further radio communication device comprises an input device.

In example 49, the subject-matter of any one of examples 42 to 48 can optionally include that the second further radio communication device comprises a set top box.

In example 50, the subject-matter of any one of examples 42 to 49 can optionally include that the receiving comprises receiving according to a Wi-Fi communication standard.

In example 51, the subject-matter of any one of examples 42 to 50 can optionally include that the sending comprises sending according to a Wi-Fi communication standard.

In example 52, the subject-matter of any one of examples 42 to 51 can optionally include that the request for paring comprises a request for pairing according to a Bluetooth communication standard.

In example 53, the subject-matter of any one of examples 42 to 52 can optionally include that the first information indicating the Received Signal Strength Indication in the first further radio communication device comprises information indicating a Received Signal Strength Indication of a transmission from the radio communication device to the first further radio communication device.

In example 54, the subject-matter of any one of examples 42 to 53 can optionally include that the second information indicating the Received Signal Strength Indication in the second further radio communication device comprises information indicating a Received Signal Strength Indication of a transmission from the radio communication device to the second further radio communication device.

In example 55, the subject-matter of any one of examples 42 to 54 can optionally include discovering further radio communication devices in a communication range of the radio communication device.

In example 56, the subject-matter of any one of examples 42 to 55 can optionally include discovering the first further radio communication device in a communication range of the radio communication device and the second further radio communication device in a communication range of the radio communication device.

Example 57 is a method for controlling a radio communication device, the method comprising: determining a Received Signal Strength Indication of a further radio communication device; transmitting information indicating the determined Received Signal Strength Indication to the further radio communication device; receiving a request for pairing from the further radio communication device; and pairing with the further radio communication device based on the received request.

In example 58, the subject-matter of example 57 can optionally include that the radio communication device comprises an output device.

In example 59, the subject-matter of any one of examples 57 to 58 can optionally include that the radio communication device comprises an input device.

In example 60, the subject-matter of any one of examples 57 to 59 can optionally include that the radio communication device comprises a set top box.

In example 61, the subject-matter of any one of examples 57 to 60 can optionally include that the further radio communication device comprises a remote control In example 62, the subject-matter of any one of examples 57 to 61 can optionally include that the transmitting comprises transmitting configured according to a Wi-Fi communication standard.

In example 63, the subject-matter of any one of examples 57 to 62 can optionally include that the receiving comprises receiving according to a Wi-Fi communication standard.

In example 64, the subject-matter of any one of examples 57 to 63 can optionally include that the pairing comprises pairing with the further radio communication device according to a Bluetooth communication standard.

In example 65, the subject-matter of any one of examples 57 to 64 can optionally include that the Received Signal Strength Indication of the further radio communication device comprises a Received Signal Strength Indication of a transmission from the further radio communication device to the radio communication device.

In example 66, the subject-matter of any one of examples 57 to 65 can optionally include discovering further radio communication devices in a communication range of the radio communication device.

In example 67, the subject-matter of any one of examples 57 to 66 can optionally include discovering the further radio communication device in a communication range of the radio communication device.

Example 68 is a method for controlling a radio communication device, the method comprising: determining a Received Signal Strength Indication of a first further radio communication device; transmitting first information indicating the determined Received Signal Strength Indication to a second further radio communication device; receiving from the second further radio communication device second information indicating a Received Signal Strength Indication in the second further radio communication device; determining whether to pair with the first further radio communication device based on the first information and the second information; and pairing with the first further radio communication device based on the determination of the pairing determination circuit.

In example 69, the subject-matter of example 68 can optionally include that the radio communication device comprises an output device.

In example 70, the subject-matter of any one of examples 68 to 69 can optionally include that the radio communication device comprises an input device.

In example 71, the subject-matter of any one of examples 68 to 70 can optionally include that the radio communication device comprises a set top box.

In example 72, the subject-matter of any one of examples 68 to 71 can optionally include that the first further radio communication device comprises a remote control.

In example 73, the subject-matter of any one of examples 68 to 72 can optionally include that the second further radio communication device comprises an input device.

In example 74, the subject-matter of any one of examples 68 to 73 can optionally include that the second further radio communication device comprises an output device.

In example 75, the subject-matter of any one of examples 68 to 74 can optionally include that the second further radio communication device comprises a set top box.

In example 76, the subject-matter of any one of examples 68 to 75 can optionally include that the transmitting comprises transmitting according to a Wi-Fi communication standard.

In example 77, the subject-matter of any one of examples 68 to 76 can optionally include that the receiving comprises receiving according to a Wi-Fi communication standard.

In example 78, the subject-matter of any one of examples 68 to 77 can optionally include that the pairing comprises pairing with the first further radio communication device according to a Bluetooth communication standard.

In example 79, the subject-matter of any one of examples 68 to 78 can optionally include that the Received Signal Strength Indication of the further radio communication device comprises a Received Signal Strength Indication of a transmission from the first further radio communication device to the radio communication device.

In example 80, the subject-matter of any one of examples 68 to 79 can optionally include that the information indicating the Received Signal Strength Indication in the second further radio communication device comprises information indicating a Received Signal Strength Indication of a transmission from the first further radio communication device to the second further radio communication device.

In example 81, the subject-matter of any one of examples 68 to 80 can optionally include discovering further radio communication devices in a communication range of the radio communication device.

In example 82, the subject-matter of any one of examples 68 to 81 can optionally include discovering the second further radio communication device in a communication range of the radio communication device.

Example 83 is a computer readable medium having recorded instructions thereon which, when executed by a processor, make the processor perform a method for controlling a radio communication device according to any one of examples 42 to 56.

Example 84 is a computer readable medium having recorded instructions thereon which, when executed by a processor, make the processor perform a method for controlling a radio communication device according to any one of examples 57 to 67.

Example 85 is a computer readable medium having recorded instructions thereon which, when executed by a processor, make the processor perform a method for controlling a radio communication device according to any one of examples 68 to 82.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A first set top box comprising:
   a Received Signal Strength Indication determination circuit configured to determine a Received Signal Strength Indication of a transmission from a radio communication device to the first set top box;
   a Received Signal Strength Indication transmitter configured to transmit a first information indicating the determined Received Signal Strength Indication to a second set top box;
   a Received Signal Strength Indication receiver configured to receive from the second set top box a second information indicating a Received Signal Strength Indication of a transmission from the radio communication device to the second set top box;
   a pairing determination circuit configured to determine whether to pair with the radio communication device based on the first information and the second information; and
   a pairing circuit configured to pair with the radio communication device based on the determination of the pairing determination circuit.

2. The first set top box of claim 1, wherein the radio communication device comprises a remote control.

3. The first set top box of claim 1, wherein the Received Signal Strength Indication transmitter is configured according to a Wi-Fi communication standard.

4. The first set top box of claim 1, wherein the Received Signal Strength Indication receiver is configured according to a Wi-Fi communication standard.

5. The first set top box of claim 1, wherein the pairing circuit is configured to pair with the radio communication device according to a Bluetooth communication standard.

6. A method for controlling a first set top box, the method comprising:
   determining a Received Signal Strength Indication of a transmission from a radio communication device to the first set top box;
   transmitting a first information indicating the determined Received Signal Strength Indication to a second set top box;
   receiving from the second set top box a second information indicating a Received Signal Strength Indication of a transmission from the radio communication device to the second set top box;

determining whether to pair the first set top box with the radio communication device based on the first information and the second information; and pairing the first set top box with the radio communication device based on a determination to pair.

7. The method of claim 6, wherein the radio communication device comprises a remote control.

8. A non-transitory computer readable medium having recorded instructions thereon which, when executed by a processor, cause the processor to:

determine a Received Signal Strength Indication of a transmission from a radio communication device to a first set top box;

transmit a first information indicating the determined Received Signal Strength Indication to a second set top box;

receive from the second set top box a second information indicating a Received Signal Strength Indication of a transmission from the radio communication device to the second set top box;

determine whether to pair the first set top box with the radio communication device based on the first information and the second information; and pair the first set top box with the radio communication device based on a determination to pair.

9. The non-transitory computer readable medium of claim 8, wherein the radio communication device comprises a remote control.

* * * * *